(12) United States Patent
Wakim et al.

(10) Patent No.: US 6,477,178 B1
(45) Date of Patent: Nov. 5, 2002

(54) SYSTEM AND METHOD AND TRAFFICKING TELECOMMUNICATION SIGNALS

(75) Inventors: Kameel I. Wakim, Plano, TX (US); Joseph A. Crossett, III, Richardson, TX (US); Anthony Mazzurco, Plano, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/052,918

(22) Filed: Mar. 31, 1998

(51) Int. Cl.[7] .................................................. H04J 3/16
(52) U.S. Cl. ...................................... 370/466; 370/907
(58) Field of Search ................................. 370/465, 401, 370/466, 539, 467, 538, 542, 543, 907; 359/135

(56) References Cited

U.S. PATENT DOCUMENTS

| | | | | |
|---|---|---|---|---|
| 5,315,594 A | * | 5/1994 | Noser | 370/353 |
| 5,572,515 A | | 11/1996 | Williamson et al. | |
| 5,623,357 A | * | 4/1997 | Kight et al. | 359/135 |
| 5,878,039 A | | 3/1999 | Gorshe et al. | |
| 5,917,827 A | * | 6/1999 | Cantwell | 370/466 |
| 6,011,802 A | * | 1/2000 | Norman | 370/466 |
| 6,014,708 A | * | 1/2000 | Klish | 709/232 |
| 6,094,440 A | | 7/2000 | Sugawara et al. | |

OTHER PUBLICATIONS

C. Hwu, et al., "International Gateway for SDH and SONET Interconnection", IEEE, 1994, pp. 725–734.
G.W. Ester, "Can SONET Handel SDH Traffic?", Telephony, vol. 225, No. 13, Sep. 27, 1993, pp. 34, 36, 40.
K. Rao, et al., "SDH—SONET Interworking", Interworking in Broadband Networks, Jan. 1, 1993, pp. 290–304.

\* cited by examiner

*Primary Examiner*—Alexander O Boakye
(74) *Attorney, Agent, or Firm*—Baker Botts, LLP; V. Lawrence Sewell; Jessica W. Smith

(57) ABSTRACT

A method of trafficking telecommunication signals having various formats, includes providing, at a first network element, a synchronous payload envelope having a first format, the synchronous payload envelope comprising a synchronous path and associated overhead portion and a payload portion, mapping the synchronous payload envelope into a transport signal having a second format without terminating the synchronous path or associated overhead portion of the synchronous payload envelope, and transmitting the transport signal to a second network element over a network supporting the second format.

18 Claims, 4 Drawing Sheets

SYSTEM AND METHOD AND TRAFFICKING TELECOMMUNICATION SIGNALS

TECHNICAL FIELD OF THE INVENTION

This invention relates generally to the field of communications and more particularly to a system and method of trafficking telecommunication signals having different formats.

BACKGROUND OF THE INVENTION

Telecommunication networks in North America generally support the Synchronous Optical Network ("SONET") format. Telecommunication networks in various other parts of the world, such as Europe, typically support the Synchronous Digital Hierarchy ("SDH") format. When transmitting signals internationally it is typically necessary to traffic the signals through both SONET and SDH networks. As used throughout this document, the terms "traffic" or "trafficking" refer generally to the transmission, reception, switching, mapping, performance monitoring and various other functions relating to management of telecommunication signals.

Transitioning from a SONET network to an SDH network generally requires terminating the SONET-based synchronous path and associated overhead portions of the SONET-based signal, extracting a desired asynchronous payload, remapping the payload into an SDH-based signal, and reconstructing the synchronous path and associated overhead portions according to SDH standards. Transitioning from an SDH network to a SONET network typically involves similar steps of path termination, embedded signal extraction, signal remapping, and reconstruction of synchronous path and associated overhead according to SONET standards.

There are disadvantages associated with having to terminate the synchronous path and overhead portions associated with these signals when transitioning between networks supporting different formats. Terminating the synchronous path and associated overhead portion increases the cost of the equipment by introducing additional ports necessary to handle the lower-level embedded signals after path termination. Terminating synchronous path and associated overhead also increases the probability of signal integrity loss during the transition from one format to the other. Each time the synchronous path and associated overhead is terminated and reconstructed, there is an additional potential for introducing error.

SUMMARY OF THE INVENTION

In accordance with the present invention, a system and method for trafficking telecommunication signals having different formats is provided that substantially eliminate or reduce disadvantages or problems associated with previously developed systems and methods. In particular, the present invention facilitates trafficking telecommunication signals having a first format over a network supporting a second format, without terminating the synchronous path or associated overhead portions of each signal.

In one embodiment of the present invention, a method of trafficking telecommunication signals having various formats comprises providing, at a first network element, a synchronous payload envelope having a first format, the synchronous payload envelope comprising a synchronous path and associated overhead portion and a payload portion, mapping the synchronous payload envelope into a transport signal having a second format without terminating the synchronous path or associated overhead portions of the synchronous payload envelope, and transmitting the transport signal to a second network element over a network supporting the second format.

Technical advantages of the present invention include the provision of a method and apparatus for trafficking telecommunication signals having a first format over a network supporting a second format without terminating the synchronous path or associated overhead portions of each signal. Cross connecting signals having different formats without terminating the synchronous path or associated overhead portions of the signals provides an advantage of facilitating inexpensive switching across SONET and SDH networks while preserving the ability to monitor the performance of the signals being switched. Eliminating the need to terminate synchronous path and associated overhead portions of the signal saves equipment cost by eliminating the need for ports to terminate embedded signals. Avoiding termination of the synchronous path and associated overhead portion also aids to ensure signal integrity by leaving the synchronous path and associated overhead portion intact. Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF THE INVENTION

Figure 1:
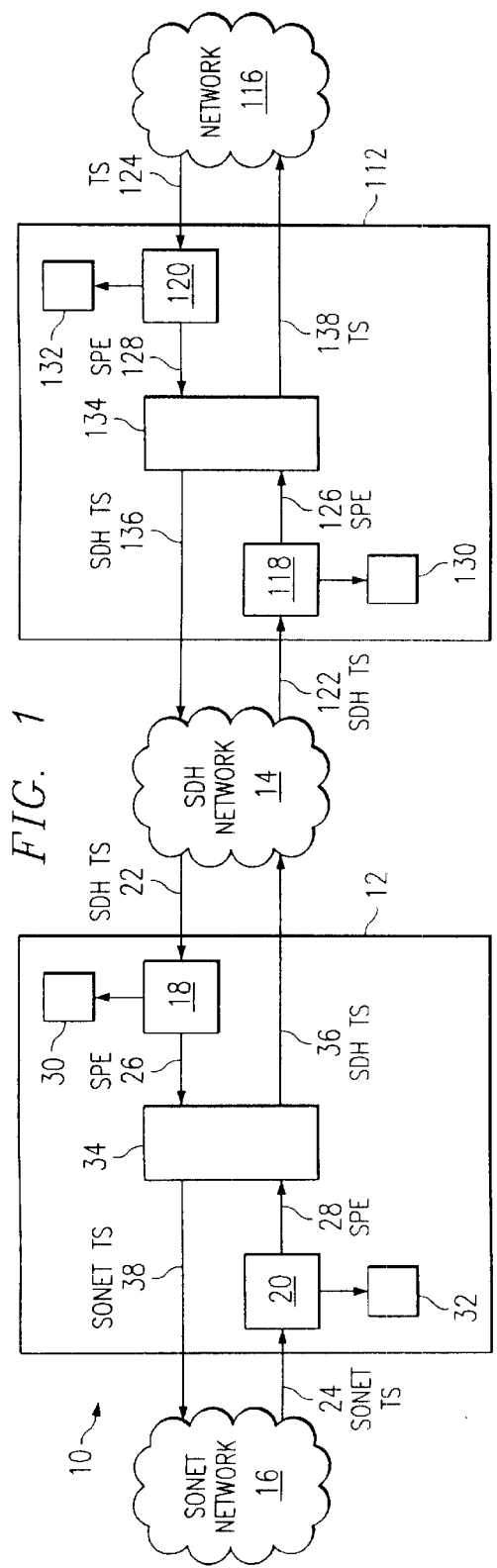
FIG. 1 is a block diagram of a system for trafficking telecommunication signals constructed according to the teachings of the present invention.

FIG. 1 is a block diagram of a system for trafficking telecommunication signals constructed according to the teachings of the present invention. Throughout this document, the terms "traffic" or "trafficking" broadly refer to transmission, reception, switching, mapping, performance monitoring and various other functions relating to management of telecommunication signals. System 10 includes a first network element 12 coupled to a second network element 112. Throughout this document, the term "coupled" denotes either direct, or indirect communication between two or more elements by any appropriate coupling arrangement. Furthermore, the term "coupled" does not necessarily denote a physical connection; it is broad enough to encompass any wireline, wireless, electrical, optical or other suitable method of communication between two or more elements.

In the illustrated embodiment, first network element 12 is coupled to second network element 112 through a network 14. Each of first and second network elements 12 and 112 may couple to additional network elements (not explicitly shown) through one or more additional networks, such as networks 16 and 116, respectively. In addition, network elements 12 and 112 may couple to additional network elements (not explicitly shown) within networks 14, 16, and 116.

Networks 14, 16, and 116 may comprise any suitable wireline or wireless system, or combination thereof, that supports communication between various network elements. For example, each of networks 14, 16, and 116 may be a public switched telephone network (PSTN), an integrated services digital network (ISDN), a local area network (LAN), a wide area network (WAN), a global computer network such as the Internet or other dedicated switched network, or other communication system at one or more locations. System 10 may comprise any one or a combination of such types of networks.

In the illustrated embodiment, network 14 comprises a synchronous digital hierarchy (SDH) network. Network 14 may couple first network element 12 located, for example, in New York, U.S.A., to second network element 112 located, for example, in Paris, France. In this embodiment, network 16 comprises a synchronous optical network (SONET). Network 16 may couple first network element 12 located, for example, in New York, U.S.A., to another network element (not explicitly shown) located, for example, in Los Angeles, U.S.A. Similarly, network 116 may couple second network element 112 to another network element (not explicitly shown) located, for example, in London, England.

Network elements 12 and 112 may comprise, for example, cross connects operable to receive telecommunication signals having different formats, and to switch the contents of those signals without terminating the synchronous path or associated overhead portions of the signals. Throughout this document, the term "telecommunication signal" is specifically intended to encompass signals having payloads capable of carrying voice, video, and/or various forms of data. In the illustrated embodiment, as will be described in greater detail below, each of network elements 12 and 112 is capable of receiving and processing signals having a SONET format and signals having an SDH format. As discussed in detail below, the manner in which network elements 12 and 112 deal with each signal depends on the format of the particular signal. Cross connecting signals having different formats without terminating the synchronous path or associated overhead portions of the signals provides an advantage of facilitating inexpensive switching across SONET and SDH networks while preserving the ability to monitor the performance of the signals being switched. Details of the performance monitoring characteristics of system 10 will be described below.

Network elements 12 and 112 are similar in structure and function. For clarity and simplicity of description, the following description of these network elements will be limited a discussion of network element 12. It should be understood that network element 112 includes similar components and functionality.

Network element 12 includes synchronous payload envelope (SPE) decoders 18 and 20, which are operable to receive incoming synchronous transport signals 22 and 24 from networks 14 and 16, respectively. In this embodiment, incoming synchronous transport signal 22 comprises an SDH-based transport signal. SDH-based transport signal 22 may comprise, for example, a Synchronous Transport Module level-4 (STM-4) signal; however, other types of SDH-based transport signals can likewise be processed. Synchronous transport signal 24 comprises a SONET-based transport signal. SONET-based transport signal 24 may comprise, for example, an Optical Carrier level-12 (OC-12) signal, although other types of SONET-based transport signals can be processed in accordance with the teachings of the present invention. Specific signal levels are denoted herein for exemplary purposes only, and are not intended to limit the scope of the invention.

SPE decoders 18 and 20 are operable to receive and process incoming transport signals 22 and 24 by, for example, terminating the transport overhead associated with these signals, and extracting synchronous payload envelopes (SPE) 26 and 28, respectively therefrom. In the illustrated embodiment, SPE 26 comprises an SDH-based virtual container level-3 (VC-3), and SPE 28 comprises a SONET-based synchronous transport signal level one synchronous payload envelope (STS-1 SPE). In addition to terminating transport overhead and extracting SPEs, SPE decoders may comprise path termination components (not explicitly shown) operable to terminate the synchronous path and associated overhead portions of the SPEs received, and to extract component signals carried by the SPEs.

Performance monitoring units 30 and 32 are coupled to SPE decoders 18 and 20, respectively. As will be discussed in detail below, performance monitoring units 30 and 32 are operable to identify the format of each signal received, and to provide signal monitoring functionality, such as path tracing and error detection, in accordance with standards associated with the format of each signal. For example, if performance monitoring unit 30 or 32 concludes that a particular SPE follows the SONET format, performance monitoring functions will be implemented according to standards associated with the SONET format. Likewise, if performance monitoring unit 30 or 32 concludes that a particular SPE follows the SDH format, performance monitoring functions will be implemented according to standards associated with the SDH format. Although the illustrated embodiment shows SPE decoders 18 and 20 and performance monitoring units 30 and 32 as separate components, these entities could be combined into a lesser number of components.

Network element 12 further includes a matrix 34. Matrix 34 receives SPEs 26 and 28 from SPE decoders 18 and 20, respectively. Matrix 34 operates to map SPEs 26 and 28 into outgoing synchronous transport signals 36 and 38. In this embodiment, outgoing synchronous transport signal 36 comprises an SDH-based transport signal, and outgoing synchronous transport signal 38 comprises a SONET-based transport signal. Outgoing SDH-based transport signal 36 comprise, for example, an STM-4 signal. Outgoing SONET-based transport signal 38 may comprise, for example, an OC-12 signal. However, as previously discussed, other types of SDH and SONET-based signals can be processed in accordance with the teachings of the present invention.

Matrix 34 is operable to map SONET-based SPEs into SONET-based transport signals or SDH-based transport signals. Similarly, matrix 34 can map SDH-based SPEs into SDH-based transport signals or SONET-based transport signals. In each of these cases, matrix 34 accomplishes its mapping function without terminating the synchronous path or associated overhead portions of the SPEs. This provides significant advantages in reducing system cost and ensuring signal integrity. Additional details of the function of matrix 34 will be explained later in this description.

In general operation, system 10 receives a plurality of synchronous transport signals 22, 24, 122, and 124 and cross-connects the signals without terminating the synchronous path or associated overhead portions of the signals. As an example, assume it is desired to transmit a telecommunication signal originating in Los Angeles, Calif. and terminate the signal in Paris, France. Assume also that the information desired to be transmitted from Los Angeles to Paris resides within in a digital signal, level-3 (DS-3).

A network element located in Los Angeles, Calif. (not explicitly shown) first maps the DS-3 signal into a SONET-based transport signal 24, in this case an OC-12 signal that is transmitted over network 16 and received at first network element 12, located in New York, N.Y. SPE decoder 20 receives SONET-based transport signal 24 and extracts SONET-based SPE 28 containing an asynchronously mapped DS-3. In this case, SONET-based SPE comprises an STS-1 SPE containing the asynchronously mapped DS-3. Performance monitor unit 32 is operable to receive SONET-based SPE 28, identify its format, and perform signal monitoring functions, such as path tracing and error detection, according to standards associated with the format (SONET) of SPE 28. Performance monitoring unit 32 can be operable to report results of the monitoring functions to a network element manager (not explicitly shown), or to transmit these results to other network elements to facilitate full-network performance monitoring. Additional details of the structure and function of performance monitoring unit 32 will be described later in this document.

Figure 2:
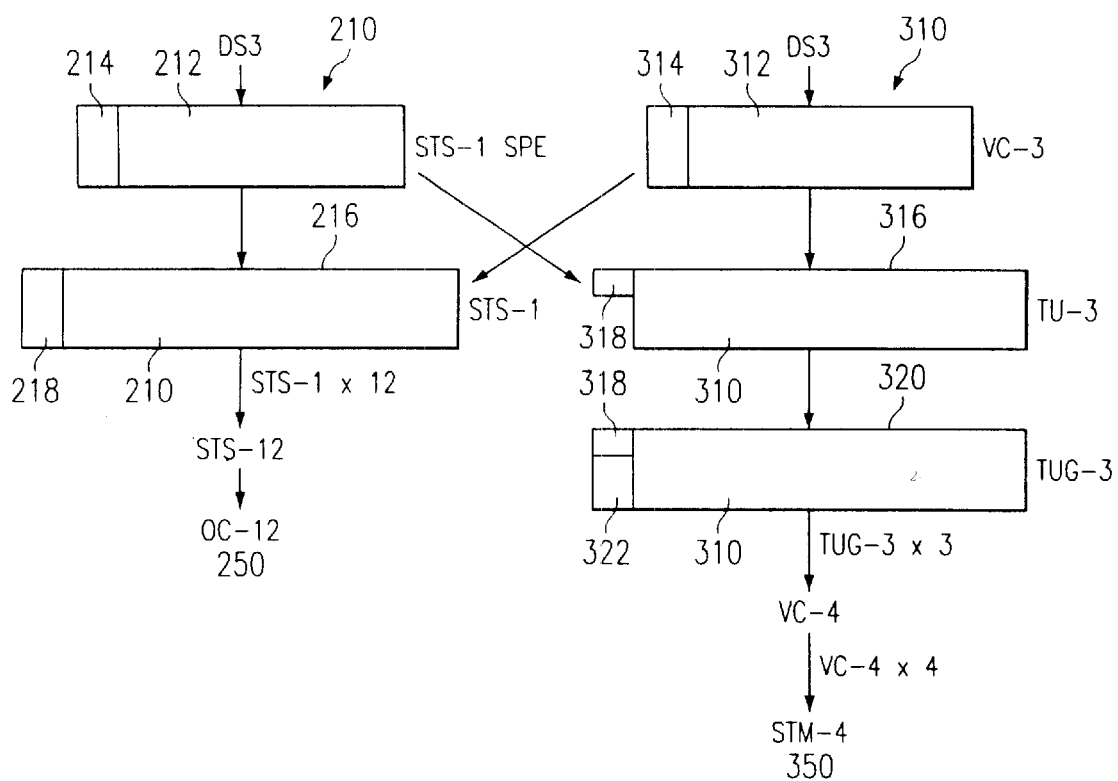
FIG. 2 is a block diagram illustrating a mapping of telecommunication signals according to the teachings of the present invention.

Matrix 34 receives SONET-based SPE 28 from SPE decoder 20, and maps SONET-based SPE 28 into SDH-based transport signal 36 without terminating the synchronous path and associated overhead portion of SONET-based SPE 28, as discussed further in connection with FIG. 2. Once SONET-based SPE 28 has been mapped into SDH-based transport signal 36, first network element 12 transmits SDH-based transport signal 36 over network 14 to second network element 112, which is located in Paris, France in this example.

During transmission through network 14, SDH-based transport signal 36 may pass through an appropriate number of intermediate network elements (not explicitly shown) prior to reaching second network element 112. While passing through network 14, the intermediate network elements can be operable to modify SDH-based transport signal 36 by removing certain SPEs and adding others. SDH-based transport signal 122 represents the transport element containing the desired path after it has been transmitted through network 14. SDH-based transport signal 122 comprises SONET-based SPE 28, and may or may not include other SPEs originally contained in SDH-based transport signal 36.

SPE decoder 118 of second network element 112 receives SDH-based transport signal 122 and extracts each SPE 126 therefrom. Among the SPEs 126 extracted from SDH-based transport signal 122 is SONET-based SPE 28. SPE decoder 118 can then be operable to either terminate the synchronous path and associated overhead portions of SONET-based SPE 28 and extract the DS-3 signals contained therein, or pass SONET-based SPE 28 to cross connect 134 for cross-connection and inclusion within an outgoing transport signal 136 or 138.

Once SPE decoder 118 extracts SONET-based SPE 28, it also passes SPE 28 to performance monitoring unit 130. Performance monitoring unit 130 identifies the format of SONET-based SPE 28, and performs various monitoring activities, such as path tracing and error detection, according to standards associated with the format (SONET) of SPE 28. Again, details of the structure and operation of performance monitoring unit 130 will be described later in this document.

System 10 may also transport SDH-based SPEs within a SONET-based transport signal. For example, it may be desirable to have a second network element 112 receive from SDH network 14 an SDH-based transport signal 122 containing SDH-based SPE 126. It may also be desirable to transmit information contained in SDH-based SPE 126 to a network element in Los Angeles, Calif. (not explicitly shown).

In that case, matrix 134 of second network element 112 would be operable to receive SDH-based SPE 126 and map it into SDH-based transport signal 136 for transport across SDH network 14 to first network element 12 in New York. Such a mapping process is described below in connection with FIG. 2. SDH-based transport signal 136 emerges in New York from SDH network 14 as SDH-based transport signal 22. First network element 12 receives SDH-based transport signal 22 at SPE decoder 18. SPE decoder 18 extracts SDH-based SPE 126 from SDH-based transport signal 22, and passes SDH-based SPE 126 to performance monitoring unit 30. Performance monitoring unit 30 identifies the format (SDH) of SDH-based SPE 126, for example based on characteristics of the overhead portion of the signal, and performs various monitoring functions in accordance with standards associated with the SDH format.

SPE decoder 18 also passes SDH-based SPE 128 along with other SPEs 26 to matrix 34. Matrix 34 proceeds to map SDH-based SPE 128 into SONET-based transport signal 38, without terminating the synchronous path or associated overhead portion of SDH-based SPE 128. After mapping SDH-based SPE 128 into SONET-based transport signal 38, first network element 12 transmits SONET-based transport signal 38 over SONET network 16 to a network element (not explicitly shown) in Los Angeles, Calif.

The network element (not explicitly shown) in Los Angeles can be similar in structure and function to first and second network elements 12 and 112. As previously described, the network element in Los Angeles receives the SONET-based transport signal, extracts SDH-based SPE 128, identifies the format (SDH) of SDH-based SPE 128, and provides performance monitoring functions for SDH-based SPE 126 according to standards associated with the SDH format. The network element in Los Angeles may then terminate SDH-based SPE 128 and extract DS-3 signals contained therein.

FIG. 2 is a block diagram illustrating an exemplary mapping of telecommunication signals according to the teachings of the present invention. FIG. 2 shows a series of signals involved in a mapping of a DS-3 signal into a SONET-based OC-12 signal, and for a mapping of DS-3 signal into an SDH-based STM-4 signal. The mapping described with reference to FIG. 2 is for exemplary purposes only. The invention is not intended to be limited to mapping DS-3 signals into STS-1 and STM-4 signals. It is to be appreciated that the teachings of the present invention are also applicable to the mapping of other component signals into various levels of transmission signals.

In the SONET format, a DS-3 signal is mapped, for example, into an OC-12 signal by first mapping the DS-3 signal into an STS-1 synchronous payload envelope 210. STS-1 SPE 210 includes a payload portion 212 and a synchronous path and associated overhead portion 214. Synchronous path and associated overhead portion 214 comprises information describing, for example, the contents and origination point of the synchronous payload portion of the signal. For example, synchronous path and associated overhead portion 214 can comprise a J1 byte including information useful in performing a path trace performance monitoring function, as well as a B3 byte containing information useful in detecting errors in the signal. Each STS-1 SPE 210 is mapped into a synchronous transport signal level one (STS-1) 216. STS-1 signal 216 includes STS-1 SPE 210, along with transport overhead 218. Twelve STS-1 signals can be multiplexed together to form an electrical synchronous transport signal level-12 (STS-12). Finally, the electrical STS-12 signal can be converted to an optical OC-12 signal 250 by appropriate processing that is well established in the telecommunications industry.

In the SDH domain, a DS-3 signal is initially mapped into a virtual container level-3 SPE (VC-3) 310. Each VC-3 310 includes a payload portion 312 and a synchronous path and associated overhead portion 314. VC-3 SPEs in the SDH domain are analogous to STS-1 SPEs in the SONET domain. Each carries a substantially similar payload capacity and includes a synchronous path and associated overhead portion. The content and interpretation of information contained in the synchronous path and associated overhead portion of each signal, however, varies according to each signal's format. Like synchronous path and associated overhead portion 214 of STS-1 SPE 210, synchronous path and associated overhead portion 314 of VC-3 310 comprises information useful in facilitating performance monitoring. The format and interpretation of this information, however, is dictated by standards associated with the SDH domain, which in some cases differ from the standards associated with the SONET domain.

In mapping a VC-3 into, for example, an STM-4 transport signal, each VC-3 310 is initially mapped into a TU-3 signal 316. Each TU-3 signal 316 comprises VC-3 310 with a transmission overhead pointer 318 appended thereto. Each TU-3 signal 316 is mapped into a TUG-3 signal 320, which comprises VC-3 signal 310, transmission path pointer 318, and additional transmission overhead information 322 appended thereto. Three TUG-3s can be combined to form a Virtual Container level-4 (VC-4). Four VC-4 signals can be combined to form a Synchronous Transport Module level-4 (STM-4) signal 350. SDH-based STM-4 signal 350 carries a substantially similar payload as SONET-based OC-12 signal 250.

Matrix 34 (FIG. 1) receives synchronous payload envelopes 26 and 28, some having the SDH format, and others the SONET format. Matrix 34 is operable to map SONET-based SPEs into SONET-based transport signals according to standards associated with the SONET format, such as Bellcore standard GR-253-CORE. Similarly, matrix 34 is operable to map SDH-based SPEs into SDH-based transport signals according to standards associated with the SDH format, such as ITU-T standard G.707.

In addition to mapping SONET-based SPEs into SONET-based transport signals and SDH-based SPEs into SDH-based transport signals, matrix 34 is operable to map SONET-based SPEs into SDH-based transport signals, and SDH-based SPEs into SONET-based transport signals, without terminating the synchronous path or associated overhead portions of the SPEs. Matrix 34 accomplishes this direct cross-format mapping by mapping SONET-based SPEs as if they were SDH-based SPEs, and mapping SDH-based SPEs as if they were SONET-based SPEs.

For example, assume it is desired that a particular DS-3 signal presently contained in STS-1 SPE 210 be transmitted over SDH network 14 via STM-4 signal 350. The present invention avoids having to terminate the synchronous path and associated overhead portion 214 of STS-1 SPE 210 by mapping STS-1 SPE 210 directly into TU-3 316 as if it were a VC-3 signal. That is, matrix 34 maps STS-1 SPE 210 directly into TU-3 signal 316 according to SDH standards for mapping a VC-3 signal into a TU-3 signal. Matrix 34 accomplishes this mapping without terminating synchronous path and associated overhead portion 214 of STS-1 SPE 210. Cross connect 314 continues the mapping process according to the SDH standard and ultimately forms STM-4 signal 350, which contains the desired DS-3 signal within STS-1 SPE signal 210.

In a similar manner, VC-3 signal 310 may be directly mapped into OC-12 signal 250. In that case, matrix 34 processes VC-3 signal 310 as if it were an STS-1 SPE signal, and maps VC-3 signal 310 into STS-1 signal 216 according to SONET standards for mapping an STS-1 SPE into an STS-1 signal. Matrix 34 continues the mapping process according to SONET standards until VC-3 signal 310 has been mapped into OC-12 signal 250.

Although the previous examples discussed mapping a particular level SPE (e.g. STS-1 SPE, VC-3) into a particular level transport signal (e.g. OC-12, STM-4), matrix 34 is capable of mapping a variety of level SPEs into a variety of levels of transport signals. For example, in mapping SONET-based SPEs into SDH-based transport signals, matrix 34 can map STS-1 and STS-3C SPEs into STM-1E, STM-10, STM-4, or STM-16 SDH transport signals as applicable. In addition, matrix 34 can map STS-12C SPEs into STM-4 or STM-16 SDH transport signals. In mapping SDH-based SPEs into SONET-based transport signals, matrix 34 can map, for example, VC-3 or VC-4 SPEs into OC-3, OC-12 and OC-48 transport signals. In addition, matrix 34 can map VC-4-4c SPEs into, for example, OC-12 or OC-48 SONET transport signals. Matrix 34 can also map higher level concatenated signals. The present invention is not intended to be limited by the level of signals mapped.

Figure 3:
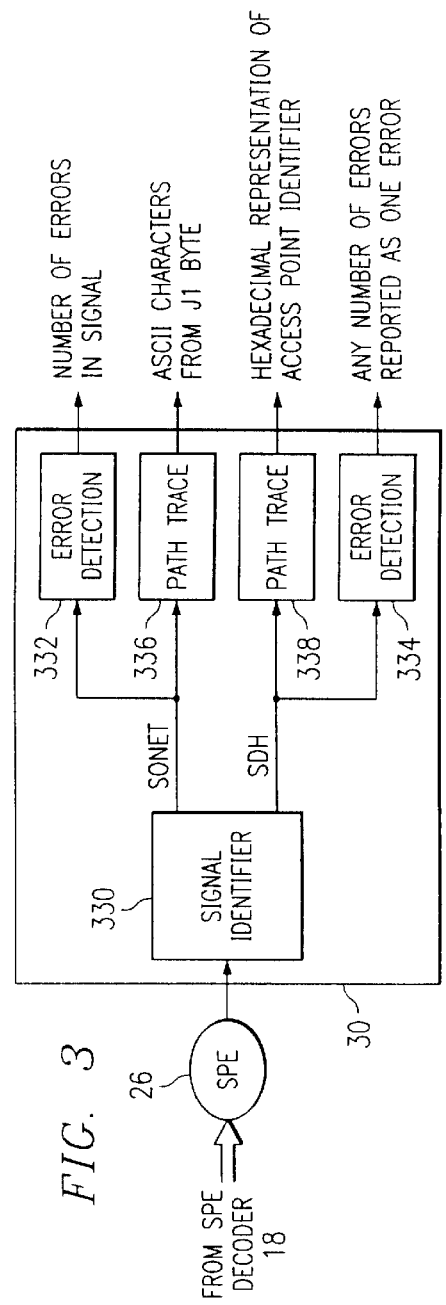
FIG. 3 is a block diagram of a performance monitoring unit constructed according to the teachings of the present invention.

FIG. 3 is a block diagram of performance monitoring unit 30 of first network element 12 (from FIG. 1). Because system 10 receives both SONET-based and SDH-based signals, performance monitoring unit 30 is preferably operable to proceed with performance monitoring functions differently depending on the format of the signals received. To that end, performance monitoring unit 30 includes a signal identifier 330, which receives SPE 26 from SPE decoder 18. Signal identifier 330 operates to identify the format of incoming SPE 26. Although the illustrated embodiment shows signal identifier 330 residing within performance monitoring unit 30, signal identifier 330 could alternatively reside within SPE decoder 18, or independently as a separate functional element (not explicitly shown). Regardless of where signal identifier 330 resides, it functions to identify the format of incoming SPE 26.

Performance monitor 30 also includes path tracers 336 and 338, which receive SONET-based and SDH-based SPEs 26, respectively. Each path tracer 336 and 338 performs a path trace function according to standards associated with the format of each signal received. Although the illustrated embodiment shows path tracers 336 and 338 as separate entities, path tracers 336 and 338 could alternatively be replaced with a single path tracer capable of performing an appropriate path trace function according to the format of each signal being monitored.

A path trace is a performance monitoring function which ensures that information received at a destination network element has not been misconnected during its transmission through the network. The path trace function may be particularly important where sensitive information is transmitted through a network, and it is desirable to ensure that the information has not been misconnected through inappropriate network elements during transmission.

The path trace function is typically implemented by inserting a known path trace message into a J1 byte of the overhead portion of each signal, and, after transmission, comparing the contents of the J1 signal to the known path trace message. The path trace message may be "known" in the sense that a terminating network element has been provisioned to recognize a particular message. Alternatively, the path trace message may be "known" in the sense that intermediate network elements can learn the repetitive message as it is received.

If the message extracted from the received signal matches the known path trace message, the integrity of the signals path through the network is ensured. If, however, the message extracted from the J1 byte of the incoming signal varies by some defined degree from the known path trace message, the signal's path integrity has been compromised. In that case, performance monitoring unit 30 can be operable to create an event, such as an alarm condition notifying the network manager that the signal's path integrity has been compromised. Where path misconnections are identified, each signal's path through the network can be traced at each network element, to determine where the signal deviated from its intended path.

The format of each signal's path trace message is defined differently by SONET and SDH standards. For example, the SONET domain defines the J1 path trace message as a repetitive 64-byte message comprising printable American Standard Code for Information Interchange (ASCII) characters terminated with carriage return and line feed characters. In the SDH domain, in contrast, the J1 path trace message comprises a 16-byte frame for the transmission of Section Access Point Identifiers, wherein the first byte of the string is a frame start marker and includes the result of a CRC-7 (error detection) calculation over the previous frame. The following 15 bytes are used for the transport of 15 T.50 characters, some of which are not printable. Performance monitoring unit 30 operates to perform the path trace function differently depending on the format of the signal received. Additional details of the operation of path tracers 336 and 338 will be explained below.

Performance monitoring unit 30 further includes error detectors 332 and 334 coupled to signal identifier 330. In general, error detectors 332 and 334 operate to perform a parity check on the data contained in each signal, and to compare the results of that parity check to data contained in a B3 byte of the synchronous path and associated overhead portion of each signal. Currently, SONET and SDH formats vary as to how the information resulting from this comparison is interpreted. Because network element 12 receives both SONET and SDH-based signals, it is advantageous for performance monitor 30 to handle error detection differently, depending on the format of each signal received.

In the illustrated embodiment, error detector 332 receives SPEs having the SONET format, and error detector 334 receives SPEs having the SDH format. Error detectors 332 and 334 report errors in the incoming signals according to procedures associated with each signal's format. Although the present embodiment illustrates the use of separate error detectors 332 and 334 for SONET and SDH-based signals, respectively, a single error detector capable of conducting error detecting and reporting functions according to the format of each signal received, could alternatively be used.

Performance monitoring unit 30 can also comprise various other functional modules operable to facilitate various other performance monitoring functions in accordance with procedures associated with the format of each signal received. For example, performance monitoring unit 30 can be operable to perform verification of signal label match.

Figure 4A:
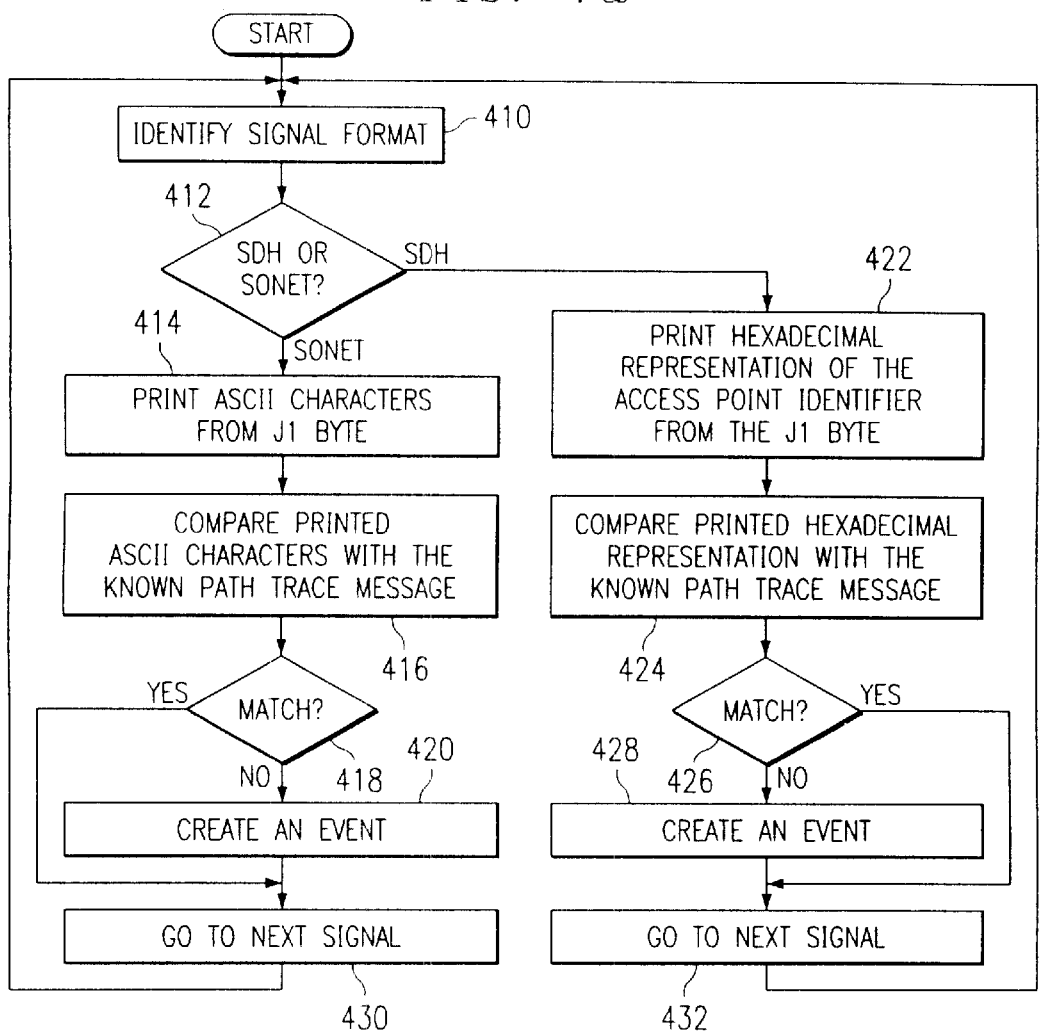
FIGS. 4a–4b are flow charts illustrating exemplary methods of monitoring the performance of telecommunication signals according to the teachings of the present invention.
Figure 4B:
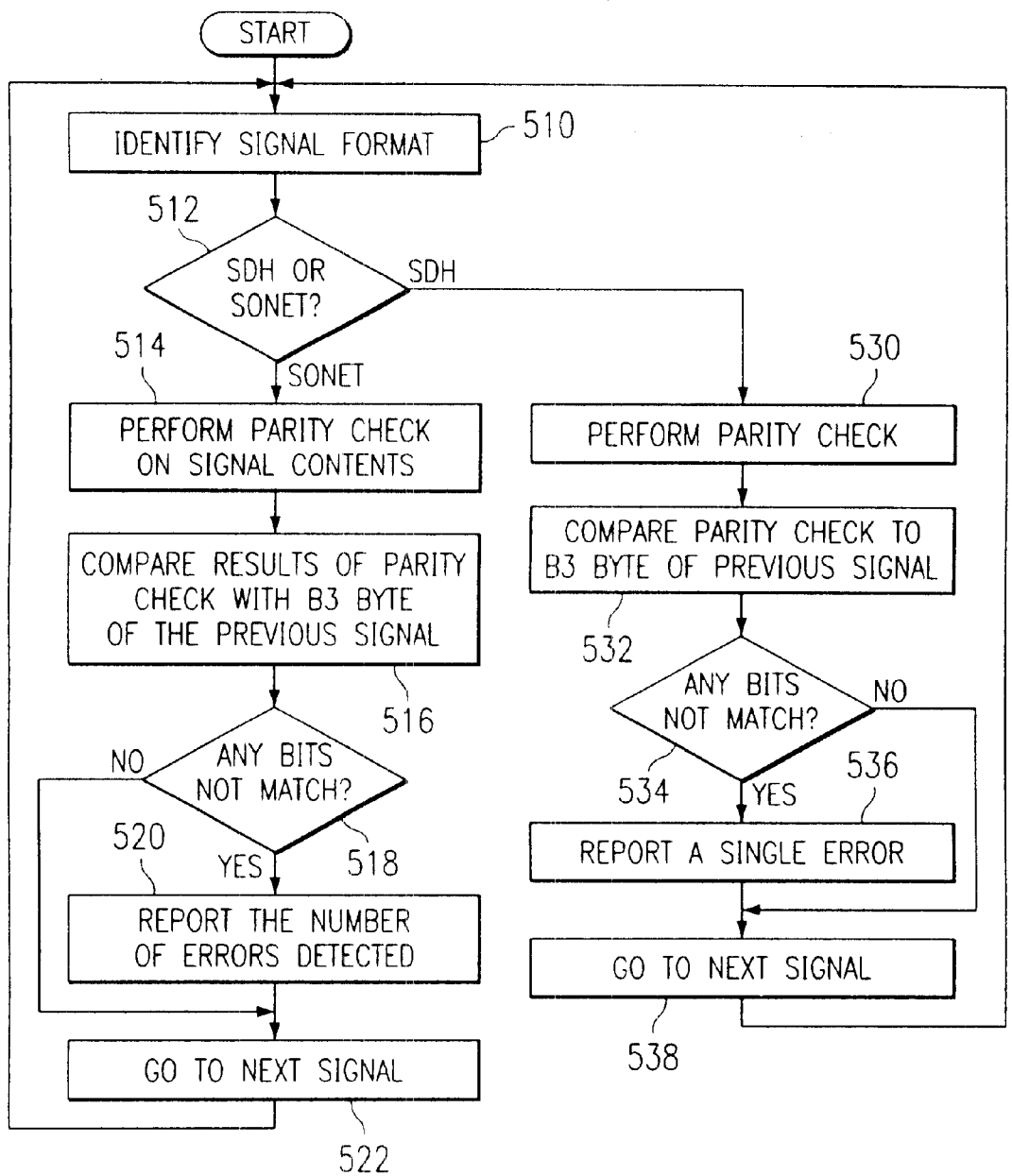

FIGS. 4A and 4B are flow charts illustrating exemplary methods of performing various monitoring functions on incoming signals.

FIG. 4A illustrates an exemplary method of providing a path trace monitoring function according to the teachings of the present invention. Upon receiving SPE 26, signal identifier 330 identifies the format of incoming SPE 26 at step 410. Signal identifier 330 can be operable to identify the format of SPE 26, for example, by examining the synchronous path and associated overhead portion of the signal. Because the format and a content of synchronous path and associated overhead portions of SONET-based signals and SDH-based signals vary, an examination of these contents can reveal the format of the signal received.

For example, by knowing the J1 byte format for each signal type, signal identifier 330 can identify the format of each signal by examining the J1 byte of each signal and looking for known characteristics associated with each format. In the illustrated embodiment, signal identifier 330 looks for a recurring 64 byte pattern ending with a carriage return line feed to identify the signal as a SONET-based signal. Signal identifier 330 also looks for a 16 byte recurring pattern beginning with a one and followed by 15 zeros to identify the signal as an SDH-based signal. Signal identifier 330 could look for any known pattern to identify the format of the signals received.

Due to the varying nature of the format and contents of the J1 byte of SONET and SDH-based signals, performance monitoring unit 30 is operable to respond appropriately, depending on the format of the signal received. In the illustrated embodiment, if signal identifier 330 identifies SPE 26 as having a SONET-based format at step 412, path tracer 336 operates to print the ASCII characters contained in the J1 byte of the synchronous path and associated overhead of SPE 26 at step 414. Path tracer 436 then compares the printed ASCII characters to a known path trace message at step 416.

If the printed ASCII characters match the known path trace message at step 418, performance monitoring unit 30 establishes that SPE 26 has been properly routed to first network element 12, and proceeds to examine the next frame of SPE 26 at step 430, which restarts the trace message. If, however, path tracer 336 establishes that the printed ASCII characters do not match the known path trace message at step 418, path tracer 336 can issue an alarm condition at step 420 to notify a network element manager (not explicitly shown) of a loss of signal integrity and/or an improper path connection in the network. In addition to verifying the message integrity, verification of the cyclic redundancy check-7 (CRC-7) may also be performed.

If, at step 412, signal identifier 410 establishes in accordance with certain predefined criteria that SPE 26 is an SDH-based signal, path tracer 338 prints hexadecimal representations of the information contained in the J1 byte of SPE 26 at step 422. Path tracer 338 next compares the hexadecimal representation of the J1 byte information to a known path trace message at step 424. If path tracer 338 establishes that the hexadecimal representation of the contents of the J1 byte match the known path trace message, it proceeds to monitor the next received signal at step 432. If, however, path tracer 338 establishes a mismatch between the hexadecimal representation of the contents of the J1 byte and the known path trace message at step 426, path tracer 338 may create an event, such as an alarm condition at step 428 notifying the network element manager (not explicitly shown) of a breach of signal integrity and/or path connections within the network.

In addition to identifying performance characteristics associated with network signals, performance monitoring unit 30 may transmit these monitored characteristics to various other network elements to assist in detecting and correcting problem points within the network.

FIG. 4B is a flowchart illustrating an exemplary method of detecting errors in signals received at first network element 12. The method begins with performance monitoring unit 30 identifying the format of SPE 26 at step 510. If SPE 26 is identified as a SONET-based signal at step 512, error detector 332 performs a parity check on the contents of SPE 26 at step 514. Error detector 332 next compares the results of its parity check with the contents of the B3 byte of the synchronous path and associated overhead portion of the previously received SPE signal 26 at step 516. If all bits of the result of the parity check match the bits of the B3 byte of the previously received signal at step 518, error detector 332 continues to the next signal at step 522. If, on the other hand, any of the bits of the result from the parity check do not match the bits contained in the B3 byte of the previously received signal at step 518, error detector 332, in accordance with standards associated with SONET-based signals, reports the total number of errors detected at step 520. The total number of errors is equal to the number of mismatched bits between the result of the parity check and the contents of the B3 byte of the previously received SPE 26.

Where performance monitoring unit 30 identifies SPE 26 as having the SDH format at step 512, error detector 334 proceeds to perform a parity check on the contents of SPE 26 at step 530. The results of this parity check are compared against the contents of the B3 byte of the previously received SPE 26 signal at step 532. If error detector 324 determines that all bits of the result of the parity check match associated bits in the B3 byte of the previously received signal at step 534, no errors are detected and error detector 334 proceeds to the next SPE 26 at step 538. If, however, any of the bits from the result of the parity check do not match bits stored in the B3 byte of the previously received at step 534, error detector 334, in accordance with standards associated with SDH-based signals, reports the presence of a single error at step 536, regardless of the number of errors detected.

Performance monitor 30 provides an advantage of facilitating various performance monitoring functions according to standards associated with the various formatted signals received.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of trafficking telecommunication signals having various formats, comprising:

providing, at a first network element, a synchronous payload envelope having a first format, the synchronous payload envelope comprising a synchronous path and associated overhead portion and a payload portion;

mapping the synchronous payload envelope into a transport signal having a second format without terminating the synchronous path or associated overhead portion of the synchronous payload envelope; and transmitting the transport signal to a second network element over a network supporting the second format;

receiving the transport signal from the network having the second format;

identifying the synchronous payload envelope as having the first format; and providing a performance monitoring service in accordance with a standard associated with the first format.

2. The method of claim 1, further comprising transmitting performance characteristics relating to the synchronous payload envelope to the first network element.

3. A cross connect comprising a network gateway operable to facilitate cross connection of a plurality of signals between a first network supporting a first format and a second network supporting a second format, without necessitating termination of a synchronous path and associated overhead portion of the signal being cross connected, the gateway comprising:

a synchronous payload envelope decoder operable to receive a transport signal and extract a synchronous payload envelope from the transport signal, the synchronous payload envelope having a first format;

a matrix operable to receive the synchronous payload envelope having the first format and to map the synchronous payload envelope into a transport signal having a second format without terminating the synchronous path or associated overhead portion of the synchronous payload envelope.

4. The cross connect of claim 3, wherein:

the first format comprises a synchronous optical network format; and the second format comprises a synchronous digital hierarchy format.

5. The cross connect of claim 3, wherein:

the first format comprises a synchronous digital hierarchy format; and the second format comprises a synchronous optical network format.

6. The cross connect of claim 3, wherein the synchronous payload envelope comprises a synchronous transport signal level-N synchronous payload envelope.

7. The cross connect of claim 3, wherein the synchronous payload envelope comprises a virtual container.

8. The cross connect of claim 3, wherein mapping the synchronous payload envelope into the transport signal comprises mapping the synchronous payload envelope having the first format according to a standard associated with mapping a synchronous payload envelope having the second format.

9. The cross-connect of claim 3, further comprising a performance monitoring unit coupled to the synchronous payload envelope decoder and operable to identify the format of the synchronous payload envelope and to monitor the performance of the synchronous payload envelope according to a standard associated with the format of the synchronous payload envelope.

10. A system for trafficking telecommunication signals having various formats, comprising:

a first network element comprising:

a first synchronous payload envelope decoder operable to receive a first transport signal and extract a synchronous payload envelope of the first transport signal, the synchronous payload envelope having a first format and comprising a synchronous path and associated overhead portion and a payload portion; and a matrix operable to receive the synchronous payload envelope and to map the synchronous payload envelope into a second transport signal having a second format, without terminating the synchronous path or associated overhead portion of the synchronous payload envelope; and a second network element comprising:

a second synchronous payload envelope decoder operable to receive the second transport signal, to extract the synchronous payload envelope from the second transport signal, and to identify the synchronous payload envelope as having the first format.

11. The system of claim 10, wherein:

the first format comprises a synchronous optical network format; and the second format comprises a synchronous digital hierarchy format.

12. The system of claim 10, wherein:

the first format comprises a synchronous digital hierarchy format; and the second format comprises a synchronous optical network format.

13. The system of claim 10, wherein the synchronous payload envelope comprises a synchronous transport signal level-N synchronous payload envelope.

14. The system of claim 10, wherein the synchronous payload envelope comprises a synchronous transport signal level-N concatenated synchronous payload envelope.

15. The system of claim 10, wherein the synchronous payload envelope comprises a virtual container.

16. The system of claim 10, wherein the synchronous payload envelope comprises a concatenated virtual container.

17. The system of claim 10, wherein mapping the synchronous payload envelope into the transport signal comprises mapping the synchronous payload envelope having the first format according to a standard associated with mapping a synchronous payload envelope having the second format.

18. The system of claim 10, wherein the second network element comprises a performance monitoring unit operable to monitor the performance of the signals received according to a standard associated with the format of each signal.

* * * * *